(12) United States Patent
Drescher et al.

(10) Patent No.: US 11,702,915 B2
(45) Date of Patent: *Jul. 18, 2023

(54) METHOD AND SYSTEM FOR $CO_2$ ENHANCED OIL RECOVERY

(71) Applicant: Equinor Energy AS, Stavanger (NO)

(72) Inventors: Michael Drescher, Trondheim (NO); Torbjørn Fiveland, Skien (NO); Olav Kristiansen, Trondheim (NO); Thomas Levy, Skien (NO); Knut Arild Maråk, Trondheim (NO); Bengt Olav Neeraas, Trondheim (NO); Per Ivar Karstad, Jonsvatnet (NO)

(73) Assignee: Equinor Energy AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,929

(22) Filed: Oct. 4, 2021

(65) Prior Publication Data

US 2022/0025747 A1 Jan. 27, 2022

Related U.S. Application Data

(63) Continuation of application No. 16/484,339, filed as application No. PCT/NO2018/050034 on Feb. 7, 2018, now Pat. No. 11,162,342.

(30) Foreign Application Priority Data

Feb. 7, 2017 (GB) ..................................... 1702004

(51) Int. Cl.
*E21B 43/16* (2006.01)
*E21B 43/40* (2006.01)

(52) U.S. Cl.
CPC ............ *E21B 43/164* (2013.01); *E21B 43/40* (2013.01)

(58) Field of Classification Search
CPC .............................. E21B 43/164; E21B 43/40
See application file for complete search history.

(56) References Cited

U.S. PATENT DOCUMENTS

| 2,875,832 A | 3/1959 | Martin et al. |
| 4,741,398 A | 5/1988 | Goldsberry |

(Continued)

FOREIGN PATENT DOCUMENTS

| CA | 2949087 A1 | 10/2012 | |
| WO | WO-9426426 A1 * | 11/1994 | ............. B05D 7/148 |

(Continued)

OTHER PUBLICATIONS

Apr. 17, 2018—(WO) International Search Report and Written Opinion—App PCT/NO2018/050034.

(Continued)

*Primary Examiner* — Silvana C Runyan
(74) *Attorney, Agent, or Firm* — Banner & Witcoff, Ltd.

(57) ABSTRACT

Methods of Enhanced Oil Recovery (EOR) from an oil reservoir by $CO_2$ flooding are disclosed. One method comprises producing a well stream from the reservoir; separating the well stream into a liquid phase and a gas phase with a first gas/liquid separator, wherein the gas phase comprises both $CO_2$ gas and hydrocarbon gas; cooling the gas phase with a first cooler; compressing the gas phase using a first compressor into a compressed stream; mixing the compressed stream with an external source of $CO_2$ to form an injection stream; and injecting the injection stream into the reservoir. Systems for EOR from an oil reservoir by $CO_2$ flooding are also disclosed.

25 Claims, 5 Drawing Sheets

(56) References Cited

U.S. PATENT DOCUMENTS

| | | | |
|---|---|---|---|
| 4,744,417 A | 5/1988 | Alameddine | |
| 8,066,067 B2 | 11/2011 | Donald et al. | |
| 9,303,498 B2* | 4/2016 | Grimseth | E21B 43/36 |
| 9,732,675 B2 | 8/2017 | Oelfke et al. | |
| 2004/0162452 A1 | 8/2004 | Waycuilis | |
| 2011/0197629 A1* | 8/2011 | Prim | F25J 3/0247 |
| | | | 62/618 |
| 2012/0090838 A1 | 4/2012 | Collins et al. | |
| 2013/0228330 A1* | 9/2013 | Loree | E21B 43/34 |
| | | | 166/57 |
| 2013/0298601 A1* | 11/2013 | Prim | F25J 3/0242 |
| | | | 62/618 |
| 2014/0047979 A1* | 2/2014 | Eimer | B01D 53/1456 |
| | | | 95/151 |
| 2014/0130498 A1 | 5/2014 | Randolph | |
| 2015/0267523 A1 | 9/2015 | Saponja et al. | |
| 2016/0053594 A1 | 2/2016 | Nazarian et al. | |
| 2016/0102538 A1* | 4/2016 | Murrell | C09K 8/92 |
| | | | 166/308.2 |
| 2018/0002623 A1 | 1/2018 | Noekleby et al. | |

FOREIGN PATENT DOCUMENTS

| | | |
|---|---|---|
| WO | 2009131462 A2 | 10/2009 |
| WO | 2010076282 A1 | 7/2010 |
| WO | 2014079515 A1 | 5/2014 |
| WO | 2014170466 A1 | 10/2014 |
| WO | 2015018945 A2 | 2/2015 |
| WO | 2016108697 A1 | 7/2016 |
| WO | 2016148577 A1 | 9/2016 |

OTHER PUBLICATIONS

Jun. 1, 2017—(GB) Search Report—APP 1702004.1 (IPO1).
Oct. 16, 2017—(GB) Search Report—APP 1702004.1 (IPO2).
Oct. 16, 2017—(GB) Search Report—APP 1702004.1 (IPO3).
Pal H. Nøkleby, "Taking CO2 EPO offshore", "Driving CCS forward in Norway" workshop, Sep. 10, 2015, Aker Solutions, Oslo, Norway.
Overview of the Use of CO2 as Applied to Enhanced Oil Recovery (EOR) Projects, EGRC 6th Session, Geneva, Switzerland, Apr. 2015.
Melzer, L. Stephen, Carbon Dioxide Enhanced Oil Recovery (CO2 EOR): Factors Involved in Adding Carbon Capture, Utilization and Storage (CCUS) to Enhanced Oil Recovery, Feb. 2012.
Storing CO2 with Enhanced Oil Recovery, DOE/NETL-402/1312, Feb. 7, 2008.
PCT Third Party Observation, PCT/NO2018/050034, Jun. 5, 2019.
Jul. 6, 2021—U.S. Notice of Allowance—U.S. Appl. No. 16/484,339.

\* cited by examiner

METHOD AND SYSTEM FOR $CO_2$ ENHANCED OIL RECOVERY

This application is a continuation claiming priority from U.S. application Ser. No. 16/484,339 filed on Aug. 7, 2019, which is a U.S. National Stage application under 35 USC 371 of International Application PCT/NO2018/050034, filed Feb. 7, 2018, which claims the benefit of priority from GB Application 1702004.1, filed on Feb. 7, 2017 in the United Kingdom. All of the aforementioned patent applications are herein incorporated by reference in their entireties.

The present invention relates to improved methods and systems for Enhanced Oil Recovery (EOR) from an oil reservoir by $CO_2$ flooding ($CO_2$ EOR). In particular, it relates to utilising back-produced $CO_2$ from a production well stream.

$CO_2$ EOR is a secondary or tertiary recovery method for oil production, in which $CO_2$ is injected into an oil reservoir to increase the oil recovery rate. The injection can be performed either by $CO_2$ injection alone or in combination with traditional gas and/or water injection. The use of $CO_2$ for EOR purposes has a potential to increase the oil recovery rate of a reservoir by up to 5 to 15 percentage points. It is also an effective method to store considerable amounts of $CO_2$ underground, making this process a climate change mitigating measure. Many existing applications of $CO_2$ EOR are for onshore oil fields, however its use in offshore fields is also being developed.

Some known methods utilise $CO_2$ back-produced from the oil reservoir itself, instead of or in addition to $CO_2$ from an external source. For example WO 2016/108697 teaches a method whereby a gas/liquid separator separates the gas phase from a well stream, $CO_2$ is then separated from this gas phase by a membrane separator, the $CO_2$ is then compressed and cooled and injected into the reservoir for EOR. Another method is taught in WO 2014/170466. In this method, the gas phase of a well stream is separated from the fluid, and the gas is further separated into a $CO_2$ stream and a hydrocarbon stream. These are then recombined in desired quantities in order to provide a composition comprising specific $CO_2$ and hydrocarbon components. The method comprises cyclically alternating between injecting a first composition comprising substantially pure $CO_2$ and the $CO_2$/hydrocarbon composition to provide enhanced EOR.

However, there are various issues with such methods. The separation of $CO_2$ from the gas phase can be complex and expensive, particularly since the $CO_2$ content in the gas phase is highly dynamic, from a few mole % just after breakthrough increasing up to 80-90 mole % or more. Not many technologies are applicable, particularly in an offshore, topside or subsea, application. Indeed, many difficulties exist in the practical implementation of the methods described in the prior art, for example in terms of avoiding hydrate formation in the separated gas and the mixture of separated gas and external $CO_2$, the highly dynamic operational conditions for the main process equipment (such as separators, heat exchangers and compressors), material issues in the liquid pipeline and process equipment in the existing oil processing facility due to high $CO_2$ content in the liquid phase and compressor requirements.

The present invention seeks to address these problems.

According to a first aspect, the present invention provides a method of Enhanced Oil Recovery (EOR) from an oil reservoir by $CO_2$ flooding, comprising: producing a well stream from the reservoir; separating the well stream into a liquid phase and a gas phase with a first gas/liquid separator, wherein the gas phase comprises both $CO_2$ gas and hydrocarbon gas; cooling the gas phase with a first cooler; compressing the gas phase using a first compressor into a compressed stream; mixing the compressed stream with an external source of $CO_2$ to form an injection stream; and injecting the injection stream into the reservoir.

This method provides significant advantages over the prior art. Firstly, the gas phase processed into an injection stream and injected into the reservoir comprises both $CO_2$ and hydrocarbons. In other words, after separating the gas phase from the liquid phase, the $CO_2$ and hydrocarbon gas present in the gas phase are not further separated into individual streams and only the $CO_2$ stream utilised as in prior art methods. Instead, the complete gas phase is processed and formed into an injection stream.

Thus, at each stage in the method, and at the point of injection into the reservoir, the gas phase/injection stream comprises both $CO_2$ and hydrocarbons. Moreover, it may be considered that the entire (or substantially the entire) gas component separated by the first gas/liquid separator is injected (either as gas or after being condensed) into the reservoir. In other words, no gas fraction, in particular no hydrocarbon fraction, is removed. The present inventors have discovered that it is not necessary to separate these gases, thus avoiding the complex and costly $CO_2$ separation step frequently found in the prior art. This is particularly the case in relation to oil reservoirs with a low Gas to Oil Ratio (GOR), since the higher pressure required to inject a $CO_2$+ hydrocarbon stream is less problematic. Thus, preferably the method is utilised with a low GOR oilfield. Moreover, $CO_2$ separation in offshore environments is particularly challenging, thus the method of the invention provides particular advantages in relation to such environments. The injection, in the invention, of a stream formed from the complete gas phase simplifies the process and provides a commercially viable solution.

It will be appreciated that this first aspect of the invention defines a method carried out after $CO_2$ breakthrough into the well stream has occurred, in other words $CO_2$ is being back-produced from the reservoir into the well stream. Thus, $CO_2$ is present in the gas phase separated by the first gas/liquid separator, and is then, after the various processing steps, re-injected into the reservoir to enhance the oil recovery by $CO_2$ flooding. Prior to this method of the invention being carried out, in a first phase of operation prior to $CO_2$ breakthrough, in order to inject $CO_2$ into the reservoir, $CO_2$ must be supplied only from an external source. An aspect of the invention including also this first phase of operation is described later.

It will be appreciated that by "an external source of $CO_2$" means $CO_2$ not produced from the reservoir, but rather provided from a source external to the EOR process. The $CO_2$ may be pure $CO_2$, and may come from natural sources of $CO_2$ or $CO_2$ captured from industrial processes. For example, $CO_2$ may be $CO_2$ captured from industrial processes such as cement production and ammonia production, or captured from exhaust gases from power and heat production, onshore or offshore. The external $CO_2$ may be gaseous $CO_2$, but is most preferably liquid $CO_2$.

Mixing with external $CO_2$ is particularly beneficial in a first period after $CO_2$ breakthrough. In this early phase the flow rate of the gas from the well stream may be quite low and comprise a large proportion of methane and the external $CO_2$ is needed to maintain injection flow-rate. After $CO_2$ breakthrough, the content of $CO_2$ in the well stream will increase, and the need for external $CO_2$ will decrease. At some point, the back-produced $CO_2$ may be sufficient that in a further phase of operation, after the method of the invention, the supply of external $CO_2$ is stopped.

Mixing the gas phase with an external source of $CO_2$ provides further significant advantages. In a first period after $CO_2$ breakthrough, the gas phase flow from the first compressor (the output of the compressor is generally gas, possibly with small amount of liquid) will be low and contain high concentrations of methane. This gas should preferably be condensed prior to injection into the reservoir. However, a very high pressure from the first compressor would be required for condensation by sea-water alone, and there would be a high risk of hydrate formation. However, by mixing the gas phase with external $CO_2$ (preferably liquid $CO_2$), the gas phase may condense/dissolve during the mixing process. Consequently, after mixing, the injection stream may preferably be a liquid phase or a gas+liquid phase.

In situations where the injection stream is a gas phase (or has a significant proportion of gas phase) after mixing, a subsequent cooling step may be carried out by a second cooler to condense the gas fraction so that the injection stream is in the liquid phase (or is substantially in the liquid phase with only a low percentage of gas).

Alternatively, the compressed gas phase leaving the first compressor may be cooled and condensed into a liquid phase or liquid+gas phase by a second cooler prior to mixing.

The second cooler may be an active cooler, preferably with seawater circulation. The operational parameters, mainly temperatures, need to be controlled to avoid hydrate formation.

By cooling/condensing the compressed stream, its density increases and thereby the required injection pressure is reduced (high density gives a pressure increase down the injection piping).

The first compressor may preferably be a liquid tolerant compressor since liquid may form after the first cooler. If the compressor is not liquid tolerant, an additional gas/liquid separator may be required upstream the compressor. Most likely, an additional liquid pump would be required to bring the liquid phase back into the main gas liquid separator or directly into the liquid being transported to the oil processing facility. Such complexity can be avoided by using a liquid tolerant compressor.

Preferably the first cooler is an active cooler so that the cooling temperature may be controlled in order to both prevent hydrate formation and control the compressor inlet temperature.

Hydrates are to be avoided both in the first and second coolers since they can create flow blockages. The hydrate formation temperature will decide the minimum temperature in the cooling process. The hydrate formation temperature will depend on the gas composition. In a first period after $CO_2$ breakthrough, the gas phase will have a high methane content and the hydrate formation temperature will be highest. Later, when the gas phase comprises more $CO_2$, the hydrate formation temperature will decrease. For optimum injection, it is desired to have as low as temperature as possible (low temperature means high density) but it is necessary to keep above the hydrate formation temperature. For the actual compositions and operational pressures, the hydrate temperature may typically be in the range of 5-25° C.

Generally, the gas phase separated by the first gas/liquid separator will comprise a small amount of water vapour (i.e. evaporated water) in addition to $CO_2$ and hydrocarbon gas, or the gas phase may be saturated with water. Whilst the gas phase may be dehydrated to remove the water, thereby reducing the corrosive effect of the gas phase, preferably the gas phase is not dehydrated so as to avoid the associated process complexity.

The liquid phase separated by the first gas/liquid separator will generally comprise water (formation water), oil and dissolved $CO_2$.

Typically, the well stream is choked, generally to a pre-defined pressure, prior to separating the well stream into a liquid phase and a gas phase. This will release a gas from the well stream, which is then separated by the first gas/liquid separator. The pressure to which the well stream is choked determines the partial pressure/content of $CO_2$ in the gas-phase, and the content of $CO_2$ in the liquid phase. A lower pressure means a lower $CO_2$ content in the liquid. One skilled in the art would readily appreciate how to select a suitable pre-defined pressure dependent on the particular scenario.

The separation pressure will influence the compressor requirements and the power required for the stream to be injected. It will determine whether, if the liquid phase is sent to an oil processing facility, the liquid phase needs to be pressure boosted or not. If pressure boosting is required, a pump will be provided for the liquid phase.

Moreover, the separation pressure will determine whether carbon steel can be used in piping used to convey the liquid phase downstream the separator, e.g. piping connecting with an oil processing facility, or whether corrosion resistant materials are required. The higher the pressure, the more $CO_2$ there will be in the liquid phase. Due to the corrosive effect of $CO_2$, if the $CO_2$ in the liquid phase is too high, some pipeline materials such as carbon steel will suffer from corrosion to an unacceptable extent. Thus, at higher pressures, the larger amounts of $CO_2$ in the liquid phase requires downstream piping to be manufactured from corrosion resistant material, such as stainless steel. Thus, in one embodiment, the liquid phase is transported to an oil processing facility through corrosion-resistant, e.g. stainless steel, piping. Other corrosion-resistant materials may be used, such as nickel based alloys, but these are generally more expensive. Copper based alloys may also be viable. Material selection may also depend on temperature. Whilst the need for corrosion-resistant materials may have some disadvantages, the higher pressure means that additional pumping for the liquid phase may not be required. Moreover, if lower pressures were used in order to avoid the need for corrosion-resistant materials, a more technically complex compressor solution would be required.

In one embodiment, prior to separating the well stream into a liquid phase and a gas phase, the well stream is heated. This is preferably by means of a heat exchanger, more preferably by a heat exchanger utilising heat supplied by the first compressor so as to minimise the external energy requirement.

Whilst the method of the invention can be used with onshore reservoirs, it has particular application for offshore oil reservoirs, for example offering the particular advantages discussed above. In the case of offshore (i.e. subsurface) reservoirs, the entire method of the invention may be carried out subsea.

Alternatively, at least the steps of separating the well stream, cooling the gas phase and compressing the gas phase may in fact be carried out above the sea (topside), preferably on a platform or floater. The steps of mixing and cooling the injection stream may also be carried out above the sea.

In another embodiment, the step of separating the well stream is carried out subsea, whilst the steps of cooling the gas phase and compressing the gas phase are carried out above the sea, preferably on a platform or floater. This reduces the equipment topside and the amount of hydrocarbon inventory topside. This makes it easier to use an unmanned topside without a flare system. Furthermore, by carrying out the gas/liquid separation at the seabed, the liquid phase can be sent directly to the oil processing facility, and an extra liquid riser from the separation process topside to the seafloor (and then up to the oil processing facility) is avoided.

The well stream gas flow rate after $CO_2$ breakthrough will be highly dynamic (mainly increasing), especially in a first period, before a more stable situation is reached. To handle this dynamic situation, after compressing the gas phase, part of the compressed gas phase may be recycled into the well stream upstream the gas/liquid separator. Alternatively, the compressor recycle flow can be mixed into the gas phase downstream the gas/liquid separator. This compressor recycle provides more stable conditions for the separator operation, as it allows the separator to operate within narrower gas and liquid load ranges during the lifetime of the oil reservoir, which simplifies the operation and control of the separator.

Furthermore, after compressing the gas phase, part of the compressed stream may be used to form an anti-surge flow which is directed into the gas phase downstream the first gas/liquid separator and upstream the first cooler. Alternatively, gas from downstream the compressor may be mixed with the well stream upstream the first gas/liquid separator. In one embodiment, a combined compressor recycle and anti-surge line may be provided.

The injection stream may be pumped by a booster or injection pump to increase the pressure thereof prior to injection in the reservoir. Such a pumping step will generally be carried out after cooling e.g. by the second cooler. If the injection stream is liquid, this can be pumped by one common pump. Pumping is advantageous since it requires less energy/power than compression.

In one embodiment, the first compressor may in fact comprise two compressors arranged in series (or, it may be considered that after compressing the gas phase with a first compressor, the compressed stream is then further compressed with an additional compressor). Thus, after cooling the gas phase with the first cooler, it is compressed in two stages. Compression in more than one stage may be desirable if the required pressure ratio is higher than can be achieved by one compressor. However, it is preferable to use only one compressor if possible, in order to minimise cost and complexity.

It will be appreciated that the injection stream is $CO_2$-rich, since it comprises both $CO_2$ from the well stream and $CO_2$ from an external source. In one example, at the point of injection into the reservoir, the injection stream comprises 85 to 95 mole % $CO_2$.

As mentioned previously, following gas/liquid separation, the liquid phase may be transported to an oil processing facility. Generally, this will be an existing oil processing facility. Since the liquid phase will still comprise some dissolved $CO_2$, it will be corrosive, thus preferably the liquid phase is transported through corrosion-resistant piping.

As mentioned above, if it were desired to use non-corrosion resistant piping to transport the liquid phase, a low pressure could be used in the first gas/liquid separator to reduce the $CO_2$ content in the liquid phase to a level allowing the use of e.g. carbon steel piping. However, this would require a more technically complex compressor solution. The present inventors have found a solution to this problem, by using a multiple-stage separation process. In such a preferred process, after separation in the first gas/liquid separator, the liquid phase is choked to a lower pressure (i.e. a pressure lower than with which it exits the first gas/liquid separator) such that a second gas phase comprising $CO_2$ and hydrocarbon gas is released from the liquid phase. This second gas phase and liquid phase are separated in a second gas/liquid separator. By doing this, the partial pressure of $CO_2$ in the liquid phase leaving the second gas/liquid separator can be made low enough to allow for a carbon steel pipeline transporting the liquid phase e.g. to an oil processing facility, and also within the oil processing facility itself. In other words, since there is less $CO_2$ in the liquid phase, the liquid phase is less corrosive, so corrosion-resistant piping is not necessarily required and carbon steel can instead be used.

The particular partial pressure of $CO_2$ which is low enough to allow for a carbon steel pipeline will depend e.g. on temperature, oil and formation water component. However, in one example, carbon steel may be used with a $CO_2$ pressure below 5 bara (bar absolute) (500 kPa).

The second gas phase separated by the second gas/liquid separator is preferably combined with the gas phase separated by the first gas/liquid separator. Preferably this combining is carried out prior to cooling by the first cooler and compressing by the first compressor. Thus, this combined gas phase is then cooled by the first cooler, compressed by the first compressor; mixed with an external source of $CO_2$ and injected into the reservoir.

Generally, prior to being combined with the first gas phase, various processing steps are carried out on the second gas phase. In one embodiment, after being separated by the second gas/liquid separator, the second gas phase is cooled with a third cooler and then compressed, before it is combined with the gas phase separated by the first gas/liquid separator. The second gas phase may be compressed by one compressor. However, the gas flowrate from the second gas/liquid separator is substantially lower than that from the first gas/liquid separator, and to bring this gas up to the same pressure as the first gas phase multiple compressors are most likely needed. Thus, two or more compressors arranged in series may be used. These may be smaller than the first compressor compressing the first gas phase. If the total pressure ratio is low enough, intermediate cooling between the compressors is not needed, but may be required for higher pressure ratios. The compressors are preferably liquid tolerant, especially the first of two compressors arranged in series. Alternatively, dry gas compressors may be used, but upstream separators/scrubbers would then be required. The power requirement for two small compressors may be less than 10% of the main (first) compressor.

The operational conditions of the compressor(s) compressing the second gas phase are most likely constant enough that compressor recycle is not necessary. However, situations may arise where compressor recycle is needed, and in this case, after compressing the second gas phase, part of the second gas phase is recycled into the liquid phase upstream the second gas/liquid separator. Alternatively, it may be recycled into the second gas phase downstream the second gas/liquid separator.

After compressing the second gas phase, an anti-surge flow may be formed from part of the second gas phase. This may be directed into the second gas phase downstream the second gas/liquid separator and upstream the third cooler; or upstream the second gas/liquid separator.

As an alternative to compressing the second gas phase with a compressor, the pressure of the second gas phase may be increased by an ejector prior to being combined with the first gas phase separated by the first gas/liquid separator. The ejector can advantageously be powered by motive gas flow from downstream the first compressor. This simplifies the process and removes the need for the third cooler.

Whilst the second separation step using a second gas/liquid separator is described above as an optional feature in relation to the first aspect of the invention, this two-stage separation process is seen as an invention in its own right. Thus, accordingly, in a second aspect, the invention provides a method of Enhanced Oil Recovery (EOR) from an oil reservoir by $CO_2$ flooding, comprising: producing a well stream from the reservoir; separating the well stream into a liquid phase and a first gas phase with a first gas/liquid separator; reducing the pressure of the liquid phase to release a second gas phase and separating this second gas phase from the liquid phase with a second gas/liquid separator; combining the first and second gas phases into a combined gas phase; cooling the combined gas phase with a first cooler; compressing the combined gas phase into an injection stream with a first compressor; and injecting the injection stream into the reservoir.

It will be appreciated that many of the various preferred and optional features described above in relation to the first aspect of the invention are also applicable to this second aspect. Some of these will now be described, however the particular advantages of the preferred features may not be repeated here for brevity; instead, reference may be made to the advantages described above in relation to the first aspect.

This aspect of the invention is not limited to the gas phase comprising both $CO_2$ gas and hydrocarbon gas. Thus, this method may be utilised in situations where $CO_2$ gas is separated from the hydrocarbon gas. Whilst, as described above in relation to the first aspect, it is advantageous to use the entire gas phase and not only separated $CO_2$, the method of the second aspect will provide advantages even where $CO_2$ is separated from hydrocarbons.

Moreover, this aspect of the invention is not limited to an external source of $CO_2$ being mixed with the compressed stream from the first compressor. Whilst, as described above in relation to the first aspect, this mixing with external $CO_2$ offers various advantages, the method of the second aspect will provide advantages independently of the use of external $CO_2$.

By carrying out the two-stage gas/liquid separation of the second aspect of the invention, the partial pressure of $CO_2$ in the liquid phase leaving the second gas/liquid separator can be low enough to allow for a carbon steel pipeline transporting the liquid phase e.g. to an oil processing facility, and also within the oil processing facility itself. In other words, since there is less $CO_2$ in the liquid phase, the liquid phase is less corrosive, so corrosion-resistant piping is not necessarily required and carbon steel can instead be used. This is highly advantageous. The particular partial pressure of $CO_2$ which is low enough to allow for a carbon steel pipeline will depend e.g. on temperature, oil and formation water component. However, in one example, carbon steel may be used with a $CO_2$ pressure below 5 bara (500 kPa).

Moreover, this is advantageous in terms of the oil processing facility which would likely experience corrosion problems with high levels of $CO_2$. Thus, the two-stage separation process is also advantageous in avoiding the need for significant modification to the oil processing facility.

Whilst the second aspect of the invention describes a two-stage gas/liquid separation, it will be appreciated that in some situations more than two stages may be provided. In such a multi-stage gas/liquid separation process, for example, after separating the second gas phase from the liquid phase with a second gas/liquid separator, the pressure of the liquid phase may be further reduced to release a third gas phase. This third gas phase may be separated from the liquid phase with a third gas/liquid separator. All of the first, second and third gas phases may be combined into a combined gas phase which is then processed by the first cooler, first compressor and then injected into the reservoir.

It will be appreciated that this second aspect of the invention defines a method carried out after $CO_2$ breakthrough into the well stream has occurred, in other words $CO_2$ is being back-produced from the reservoir into the well stream. Thus, $CO_2$ is present in the gas phase separated by the first gas/liquid separator, and is then, after the various processing steps, re-injected into the reservoir to enhance the oil recovery by $CO_2$ flooding. Prior to this method of the invention being carried out, in a first phase of operation prior to $CO_2$ breakthrough, in order to inject $CO_2$ into the reservoir, $CO_2$ must be supplied only from an external source. An aspect of the invention including also this first phase of operation is described later.

In one embodiment, the first gas phase and the second gas phase each comprise both $CO_2$ and hydrocarbon gas. They may each also further comprise water vapour. The injection stream injected into the reservoir preferably comprises both $CO_2$ and hydrocarbons, in other words no separation process has been carried out to separate and use only the $CO_2$, however as described above the method can be used even in cases where the $CO_2$ is separated.

The first cooler is preferably an active cooler so that the cooling temperature may be controlled in order to both prevent hydrate formation and control the compressor inlet temperature.

Furthermore, the first compressor may preferably be a liquid tolerant compressor since liquid may form after the first cooler. If the compressor is not liquid tolerant, an additional gas/liquid separator may be required upstream the compressor. Most likely, an additional liquid pump would be required to bring the liquid phase back into the main gas liquid separator or directly into the liquid being transported to the oil processing facility. Such complexity can be avoided by using a liquid tolerant compressor.

Whilst, as mentioned above, this second aspect of the invention does not require an external source of $CO_2$ to be mixed into the injection stream. In one preferred embodiment such an external source of $CO_2$ is mixed into the injection stream prior to injecting the injection stream into the reservoir. This external source of $CO_2$ may be gaseous $CO_2$, but more preferably is liquid $CO_2$.

The injection stream into which the external source of $CO_2$ is mixed may comprise a gas phase, and the step of mixing the external source of $CO_2$ into the injection stream may cause the gas phase of the injection stream to at least partially condense or dissolve in the external source of liquid $CO_2$.

The method may further comprise cooling the injection stream with a second cooler, preferably by active cooling, either before or after the external source of $CO_2$ is mixed into the injection stream. This cooling step may condense at least part of a gas phase in the injection stream into liquid.

In one embodiment, the first compressor may in fact comprise two compressors arranged in series (or, it may be considered that after compressing the gas phase with a first compressor, the compressed stream is then further compressed with an additional compressor). Thus, after cooling the gas phase with the first cooler, it is compressed in two stages. Compression in more than one stage may be desirable if the required pressure ratio is higher than can be achieved by one compressor. However, it is preferable to use only one compressor if possible, in order to minimise cost and complexity.

Preferably, the well stream is choked to a pre-defined pressure prior to separating the well stream into a liquid phase and a first gas phase. This will release a gas from the well stream, which is then separated by the first gas/liquid separator. The pressure to which the well stream is choked determines the partial pressure/content of $CO_2$ in the gas-phase, and the content of $CO_2$ in the liquid phase. A lower pressure means a lower $CO_2$ content in the liquid.

Prior to separating the well stream into a liquid phase and a first gas phase, the well stream may be heated. This is preferably done via a heat exchanger, more preferably by a heat exchanger utilising heat supplied by the first compressor so as to minimise the external energy requirement.

Whilst the method may be used with onshore reservoirs, the method is particularly useful for offshore reservoirs. In the case of an offshore reservoir, the entire method of this aspect of the invention may be carried out subsea. Or, the step of separating the well stream into a liquid phase and a first gas phase may be carried out subsea, and the subsequent steps are carried out above the sea, preferably on a platform or floater. Or, at least the following steps may be carried out above the sea, preferably on a platform or floater: separating the well stream into a liquid phase and a first gas phase with a first gas/liquid separator; reducing the pressure of the liquid phase to release a second gas phase and separating this second gas phase from the liquid phase with a second gas/liquid separator; combining the first and second gas phases into a combined gas phase; cooling the combined gas phase with a first cooler; and compressing the combined gas phase into an injection stream with a first compressor.

The liquid phase from the second gas/liquid separator, comprising oil, water and dissolved $CO_2$ will generally be transported to an oil processing facility. The second gas/liquid separation process will have sufficiently reduced the $CO_2$ content in the liquid so that corrosion-resistant piping is not required to transport the liquid. Instead, carbon steel piping may be used. However, the liquid will still cause some low level of corrosion, and to protect against this a corrosion control method may be used such as injecting a film forming corrosion inhibitor into the liquid phase to limit the corrosion rate of the pipeline and process equipment and piping.

Preferably, the second gas phase is cooled by a third cooler and then compressed prior to being combined with the first gas phase. This compression may be carried out by one compressor, or in two stages by two (or more) compressors arranged in series. After compressing the second gas phase, part of the compressed second gas phase may be used to form an anti-surge flow which is directed into the second gas phase downstream the second gas/liquid separator and upstream the third cooler.

As an alternative to compressing the second gas phase with a compressor, the pressure of the second gas phase may be increased by an ejector prior to being combined with the first gas phase separated by the first gas/liquid separator. The ejector can advantageously be powered by motive gas flow from downstream the first compressor.

The well stream gas flow rate after $CO_2$ breakthrough will be highly dynamic (mainly increasing), especially in a first period, before a more stable situation is reached. To handle this dynamic situation, after compressing the gas phase, part of the compressed gas phase may be recycled into the well stream upstream the gas/liquid separator. Alternatively, the compressor recycle flow can be mixed into the gas phase downstream the gas/liquid separator. This compressor recycle provides more stable conditions for the separator operation, as it allows the separator to operate within narrower gas and liquid load ranges during the lifetime of the oil reservoir, which simplifies the operation and control of the separator.

Furthermore, after compressing the gas phase, part of the compressed stream may be used to form an anti-surge flow which is directed into the gas phase downstream the first gas/liquid separator and upstream the first cooler. Alternatively, gas from downstream the compressor may be mixed with the well stream upstream the first gas/liquid separator. In one embodiment, a combined compressor recycle and anti-surge line may be provided.

The injection stream may be pumped by a booster or injection pump to increase the pressure thereof prior to injection in the reservoir. Such a pumping step will generally be carried out after cooling e.g. by the second cooler. If the injection stream is liquid, this can be pumped by one common pump. Pumping is advantageous since it requires less energy/power than compression.

In the first and second aspects of the invention described above, the process of recycling part of the compressed gas in order to provide more stable operation in the presence of a highly dynamic gas flow rate is described as an optional feature. However, this is more generally applicable and is considered as an invention in its own right. Thus, according to a third aspect, the invention provides a method used in Enhanced Oil Recovery (EOR) from an oil reservoir by $CO_2$ flooding, comprising: producing a well stream from the reservoir; separating the well stream into a liquid phase and a gas phase with a gas/liquid separator; compressing the gas phase using a compressor; and recycling part of the compressed gas phase into the well stream upstream the gas/liquid separator or into the gas phase downstream the gas/liquid separator.

It will be appreciated that many of the various preferred and optional features described above in relation to the first and second aspects of the invention are also applicable to this third aspect. Some of these will now be described, however the particular advantages of the preferred features may not be discussed here to avoid repetition; instead, reference may be made to the advantages described above in relation to the first and second aspects.

This aspect of the invention is not limited to the gas phase comprising both $CO_2$ gas and hydrocarbon gas. Thus, this method may be utilised in situations where $CO_2$ gas is separated from the hydrocarbon gas. Whilst, as described above in relation to the first aspect, it is advantageous to use the entire gas phase and not only separated $CO_2$, the method of the third aspect will provide advantages even where $CO_2$ is separated from hydrocarbons.

Moreover, this aspect of the invention is not limited to an external source of $CO_2$ being mixed with the compressed stream from the first compressor. Whilst, as described above in relation to the first aspect, this mixing with external $CO_2$ offers various advantages, the method of the third aspect will provide advantages independently of the use of external $CO_2$.

By providing a compressor recycle flow, more stable conditions for the gas/liquid separator operation and the compressor operation are provided, by allowing the separator to operate within narrower gas and liquid load ranges during the lifetime of the oil reservoir, which simplifies the operation and control of the separator. Such a method may be used as part of any method of EOR by $CO_2$ flooding, where a compressor is used, in order to provide such advantages.

After compressing the gas phase, part of the compressed gas phase may be used to form an anti-surge flow which is directed into the gas phase downstream the gas/liquid separator and upstream the cooler. In one embodiment, a combined recycle and anti-surge line may be provided to recycle the part of the compressed gas phase and also provide the anti-surge flow. This reduces the pipework required.

The gas phase may be cooled with a first cooler, prior to compressing the gas phase. Part of the compressed gas phase may be recycled into the gas phase downstream the gas/liquid separator and upstream the first cooler.

The first compressor may preferably be a liquid tolerant compressor since liquid may form after the first cooler. If the compressor is not liquid tolerant, an additional gas/liquid separator may be required upstream the compressor. Most likely, an additional liquid pump would be required to bring the liquid phase back into the main gas liquid separator or directly into the liquid being transported to the oil processing facility. Such complexity can be avoided by using a liquid tolerant compressor.

The well stream may be choked to a pre-defined pressure prior to separating the well stream into the liquid phase and the gas phase. This will release a gas from the well stream, which is then separated by the first gas/liquid separator. The pressure to which the well stream is choked determines the partial pressure/content of $CO_2$ in the gas-phase, and the content of $CO_2$ in the liquid phase. A lower pressure means a lower $CO_2$ content in the liquid. Part of the compressed gas phase may be recycled into the well stream upstream of the gas/liquid separator and downstream the choke.

In one embodiment, the gas phase comprises $CO_2$ and hydrocarbon gas. It may also comprise a small amount of water vapour, or the gas phase may be saturated with water.

The first cooler is most preferably an active cooler so that the cooling temperature may be controlled in order to both prevent hydrate formation and control the compressor inlet temperature.

In one embodiment, prior to separating the well stream into a liquid phase and a gas phase, the well stream is heated. This is preferably by means of a heat exchanger, more preferably by a heat exchanger utilising heat supplied by the first compressor so as to minimise the external energy requirement.

Whilst the method of the third aspect can be used with onshore reservoirs, it has particular application for offshore oil reservoirs.

Whilst, as mentioned above, this third aspect of the invention does not require the mixing of an external source of $CO_2$, in one preferred embodiment an external source of $CO_2$ is mixed into the gas phase to form an injection stream. This injection stream is then injected into the reservoir. This external source of $CO_2$ may be gaseous $CO_2$, but more preferably is liquid $CO_2$. The injection stream may be cooled with a second cooler. Its pressure may be increased by pumping prior to injecting into the reservoir.

The liquid phase may be transported to an oil processing facility. Generally, this will be an existing oil processing facility.

As described previously, prior to the method of the first aspect of the invention being carried out (and indeed prior to any of the methods of the invention being carried out), there will generally be an earlier phase of operation prior to $CO_2$ breakthrough in which $CO_2$ is supplied only from an external source. Thus, in another aspect, the invention provides a method of Enhanced Oil Recovery (EOR) from an oil reservoir by $CO_2$ flooding, comprising: a first phase comprising injecting $CO_2$ from a source external to the oil reservoir into the reservoir, and a second phase comprising any of the above described methods.

Preferably, prior to commencement of the second phase, it is determined that the back-produced $CO_2$ in a well-stream produced from the reservoir exceeds a threshold value or it is determined that the $CO_2$/methane ratio in a well-stream produced from the reservoir exceeds a threshold value.

If it is determined that the $CO_2$ or $CO_2$/methane ratio does not exceed a threshold value, and thus the second phase has not yet commenced, the method may further comprise directing the well stream from the reservoir to an oil processing facility. Thus, during the first phase of operation, the well stream is directed to the oil processing facility.

In the first phase of operation when $CO_2$ is supplied only from an external source, the pressure of the external $CO_2$ may not be sufficient for direct injection into the reservoir, so preferably the method comprises pumping the external $CO_2$ to a sufficient pressure prior to injection. This pressure will depend on the pressure in the reservoir at the injection point, the necessary excess pressure to drive the $CO_2$ into the reservoir, the static pressure increase from the injection template to the injection point and the pressure drop in the injection pipe.

In the first phase of operation in which only $CO_2$ from an external source is injected into the reservoir, the injection stream therefore comprises 100 mole % $CO_2$. During the second phase of operation, the injection stream may comprise 85-95 mole % $CO_2$.

There may be a third phase of operation after the second phase wherein the mixing of external $CO_2$ is stopped. Preferably, the method includes the step of determining whether the $CO_2$ in the injection stream exceeds a certain value in the second phase, and if this value is exceeded, the mixing of external $CO_2$ is stopped. This value represents a sufficient quantity of backproduced $CO_2$ that external $CO_2$ is not required.

The invention also extends to systems arranged to perform any of the methods as described above.

In one further aspect, the invention provides an enhanced oil recovery system, comprising: a producer arranged to produce a well stream from a reservoir a first gas/liquid separator arranged to separate the well stream into a liquid phase and a gas phase comprising both $CO_2$ gas and hydrocarbon gas; a first cooler arranged to cool the gas phase; a first compressor arranged to compress the cooled gas phase into a compressed stream; a mixer arranged to mix the compressed stream with an external source of $CO_2$ to form an injection stream; and injection piping arranged to inject the injection stream into the reservoir.

This is a system corresponding to the method of the first aspect of the invention described above. Many advantages described in relation to the method and its preferred features are also clearly applicable to this system and its preferred features as described below. However, not all of these advantages will be described here in order to avoid repetition.

The first cooler may be an active cooler. The first compressor may be a liquid tolerant compressor.

The system may further comprise a choke arranged upstream the first gas/liquid separator to choke the well stream to a pre-defined pressure.

The system may further comprise a heat exchanger arranged upstream the first gas/liquid separator to heat the well stream. In this heat exchanger the well-stream may be heated in heat exchange with warm gas from the compressor discharge, provided e.g. by suitable piping.

Whilst the system may be used with an oil reservoir in any location, it is preferably configured for operation with an offshore reservoir. In such a case, the system may therefore be located entirely subsea. In another embodiment, the first gas/liquid separator, first cooler and first compressor is in fact located above the sea, preferably on a platform or a floater. In a further embodiment, the first gas/liquid separator is located subsea whilst the first cooler and first compressor are located above the sea, preferably on a platform or floater.

The system may further comprise a recycle line connecting between downstream the first compressor and either upstream the first gas/liquid separator or downstream the first gas/liquid separator. The recycle line is arranged to recycle part of the compressed gas phase into either the well stream upstream the first gas/liquid separator, or the gas phase downstream the first gas/liquid separator.

The system may also further comprise an anti-surge line connecting between downstream the first compressor and a point downstream the first gas/liquid separator and upstream the first cooler. The anti-surge line is arranged to provide an anti-surge flow of compressed gas phase into the gas phase downstream the first gas/liquid separator and upstream the first cooler. A combined recycle and anti-surge line may be provided.

In one embodiment, the first compressor may in fact comprise two compressors arranged in series (or, it may be considered that downstream the first compressor is an additional compressor) to provide compression in two stages. Compression in more than one stage may be desirable if the required pressure ratio is higher than can be achieved by one compressor. However, it is preferable to use only one compressor if possible, in order to minimise cost and complexity.

A second cooler may be provided downstream the first compressor to cool the compressed gas phase prior to being input to the mixer, or downstream the mixer to cool the injection stream. A booster pump or injection pump may be provided downstream the second cooler to pump the injection stream, prior to the injection stream being supplied to the injection piping for injection into the reservoir.

Corrosion-resistant piping is preferably used within the implementation of the system of this aspect of the invention. The system may further comprise piping arranged to transport the liquid phase to an oil processing facility. Preferably, this piping is corrosion-resistant, for example made form stainless steel.

In one particularly preferred embodiment, the system further comprises a second choke arranged to choke the liquid phase to a lower pressure so as to release a second gas phase. A second gas/liquid separator is then arranged to separate the second gas phase from the liquid phase. Piping may be provided to connect the second gas phase with the first gas phase such that the gas phases mix together.

A third cooler may be arranged downstream the second gas/liquid separator to cool the second gas phase. Further, a compressor may be arranged downstream the third cooler to compress the second gas phase. Such components would generally be provided upstream any piping connecting the second gas phase with the first gas phase.

In yet another aspect, the invention provides an enhanced oil recovery system, comprising: a producer arranged to produce a well stream from a reservoir; a first gas/liquid separator arranged to separate the well stream into a liquid phase and a gas phase; a choke arranged to reduce the pressure of the liquid phase so as to release a second gas phase; a second gas/liquid separator arranged to separate the second gas phase from the liquid phase; piping or a mixer arranged to combine or mix the first and second gas phases into a combined gas phase; a first cooler arranged to cool the combined gas phase; a first compressor arranged to compress the combined gas phase into an injection stream; and injection piping arranged to inject the injection stream into the reservoir.

This is a system corresponding to the method of the second aspect of the invention described above. Many advantages described in relation to the method and its preferred features are also clearly applicable to this system and its preferred features as described below. However, the advantages will not all be described here in order to avoid repetition.

In this system, the first cooler is preferably an active cooler. The first compressor is preferably a liquid tolerant compressor.

The system may further comprise an external source of $CO_2$, preferably liquid $CO_2$. A mixer may be arranged to mix $CO_2$ from the external source of $CO_2$ with the injection stream.

A second cooler may be provided. In one embodiment this is arranged upstream the mixer to cool the injection stream prior to mixing with the $CO_2$, and in another embodiment it is arranged downstream the mixer to cool the injection stream after mixing with the $CO_2$. Preferably, the second cooler is an active cooler. A booster pump or injection pump may be provided downstream the second cooler to pump the injection stream, prior to the injection stream being supplied to the injection piping for injection into the reservoir.

A second choke may be arranged to choke the well stream upstream the first gas/liquid separator to a predefined pressure.

Piping may be provided to transport the liquid phase to an oil processing facility. Due to the two stage separation, the liquid phase will comprise a low enough amount of $CO_2$ that corrosion resistant piping may not be required. Consequently, the piping may be made of carbon steel. However, the liquid will still cause some low level of corrosion, so to protect against this a source of film forming corrosion inhibitor may be arranged for injection into the liquid phase.

In one embodiment, the system further comprises a third cooler arranged downstream the second gas/liquid separator to cool the second gas phase. Furthermore, a compressor may be arranged downstream the third cooler to compress the second gas phase. Alternatively, instead of a compressor for compressing the second gas phase, the system may comprise an ejector arranged to increase the pressure of the second gas phase. The ejector is preferably powered by motive gas flow from downstream the first compressor.

In yet another aspect, the invention provides a system for use in enhanced oil recovery, comprising: a producer arranged to produce a well stream from a reservoir; a gas/liquid separator arranged to separate the well stream into a liquid phase and a gas phase; a compressor arranged to compress the gas phase; a recycle line arranged to direct compressed gas from downstream the compressor to either upstream the gas/liquid separator or downstream the gas/liquid separator, such that the recycle line recycles part of the compressed gas phase into either the well stream upstream the gas/liquid separator, or the gas phase downstream the gas/liquid separator.

This is a system corresponding to the method of the third aspect of the invention described above. Many advantages described in relation to the method and its preferred features are also clearly applicable to this system and its preferred features as described below. However, not all of these will be described here in order to avoid repetition.

In one embodiment, a cooler is arranged upstream the compressor to cool the gas phase. Preferably, this is an active cooler.

The system may further comprise an anti-surge line arranged to direct compressed gas as an anti-surge flow from downstream the compressor to downstream the gas/liquid separator and upstream the cooler. In one embodiment, the anti-surge line and the recycle line may be provided as a combined line.

A choke may be arranged downstream the gas/liquid separator to reduce the pressure of the well stream. In this case, the recycle line may be arranged to direct compressed gas into the well stream upstream the gas/liquid separator and downstream the choke.

Preferably, the system further comprises an external source of $CO_2$, preferably liquid $CO_2$. In this case, a mixer may be arranged to mix $CO_2$ from the external source of $CO_2$ into the gas phase to form an injection stream.

In one embodiment, a second cooler is arranged to cool the injection stream. Optionally, a pump may be arranged to pump the injection stream. Generally, the system further comprises injection piping for injecting the injection stream into the reservoir.

The invention further provides an enhanced oil recovery system, comprising: an external source of $CO_2$; injection piping arranged to inject the external source of $CO_2$ into an oil reservoir; a device for monitoring a $CO_2$ content or $CO_2$/methane ratio back-produced in a well stream from the oil reservoir; a device for determining when a $CO_2$ content or $CO_2$/methane content threshold is exceeded; and a system according to any of the embodiments described above; wherein the system further comprises piping to bypass the elements of the system according to any of the embodiments described above downstream the producer and direct the well stream to an oil processing facility, in the event that the threshold is not met. Preferably a pump is provided for pumping the external source of $CO_2$ prior to injection in the reservoir.

It will be appreciated that features described above in relation to certain aspect(s) of the invention may be equally useful when applied to other aspect(s) of the invention, and vice versa.

Preferred embodiments of the present invention will now be described by way of example only and with reference to the accompanying drawings, in which.

It will be noted that the described embodiments relate to offshore $CO_2$ EOR processes, however the skilled person will appreciate that the embodiments may equally be employed in onshore fields.

Figure 1A:
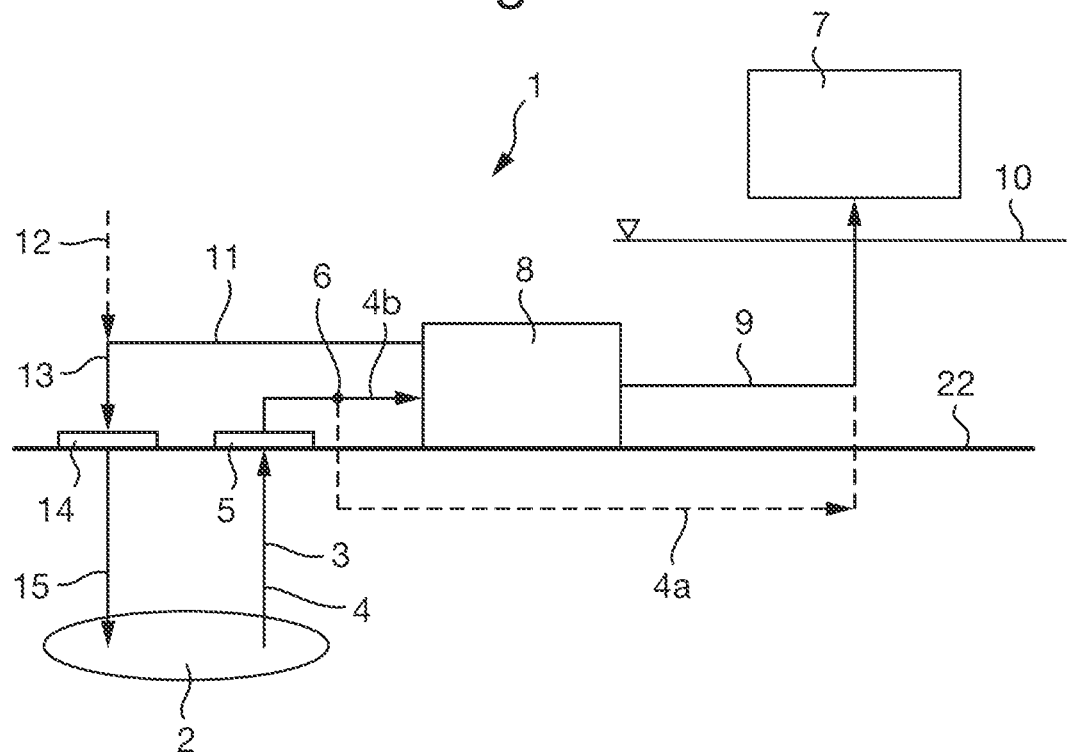
FIGS. 1a and 1b are generalised diagrams each illustrating an EOR system and method according to an embodiment of the invention wherein the entire process is carried out subsea.

FIG. 1a illustrates an EOR system 1 of an embodiment of the invention wherein the entire process is carried out subsea. A well stream 4 is produced from an oil reservoir 2 by the production tubing 3 and passed out via well head 5. At point 6 it is determined whether $CO_2$ breakthrough has occurred yet. If it has not, then the well stream, numbered 4a, is directed to an existing top-side oil processing facility 7. Reference numeral 10 indicates sea level and numeral 22 indicates the sea floor. In this case, since there is no back-produced $CO_2$, imported $CO_2$ 12 from an external source (preferably liquid $CO_2$) forms stream 13 which is injected into the reservoir 2 via injection piping 15, to provide EOR. This may be considered as a first phase of operation.

Figure 1B:
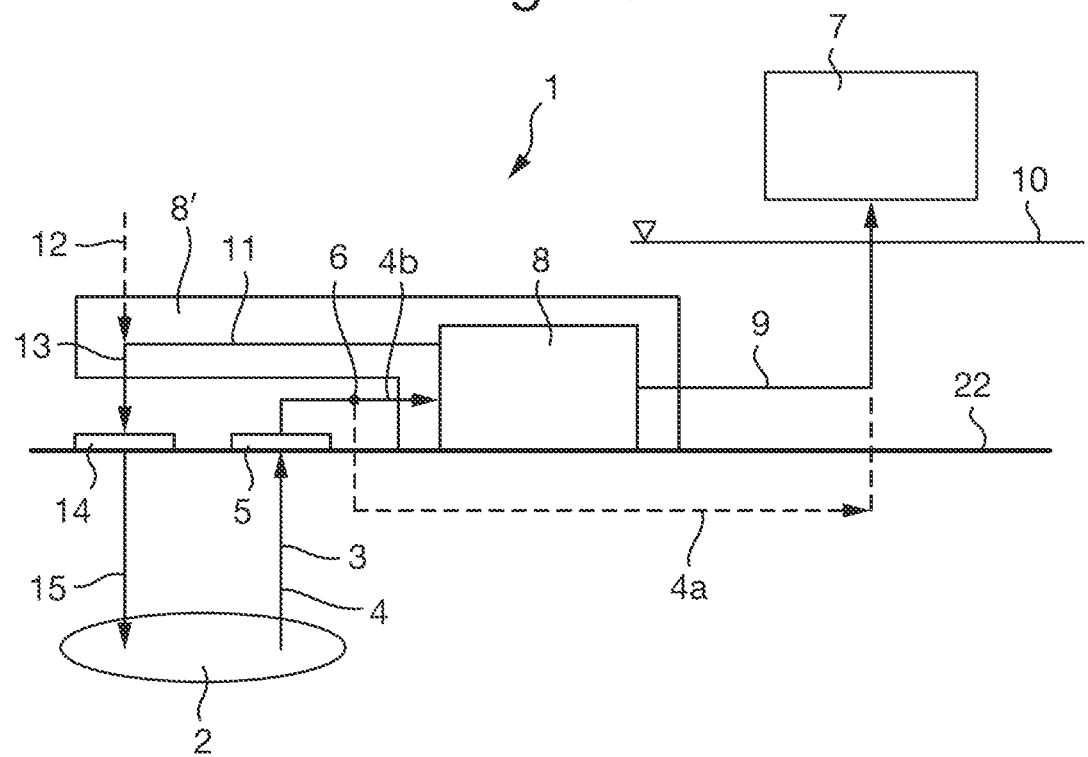

If $CO_2$ breakthrough has occurred, i.e. $CO_2$ gas is now being back-produced, then the well stream, numbered 4b, is directed to subsea process unit 8. This may be considered as a second phase of operation. Embodiments of this process unit will be described later with reference to FIGS. 3 to 5. In this process unit 8 a gas phase 11 comprising $CO_2$, and hydrocarbon gas and small amounts of dissolved water is separated from a liquid phase 9 comprising oil and water. The oil/water stream 9 is provided to the oil processing facility 7. The gas phase 11 exits the process unit 8 and is mixed with imported $CO_2$ 12 (preferably liquid $CO_2$) from an external source, to form an injection stream 13. Further process steps are carried out on this stream (not shown) and then it is provided via injection well-head 14 to injection piping/injector 15, which injects the injection stream 13 into the reservoir 2. Whilst the mixing of the gas phase 11 with the imported $CO_2$ 12 into injection stream 13 is shown outside subsea process unit 8, this may in fact typically be part of subsea process unit 8. FIG. 1b illustrates the system of FIG. 1a, but wherein these steps are incorporated into a complete subsea process unit 8', incorporating also those processes of unit 8.

Figure 2A:
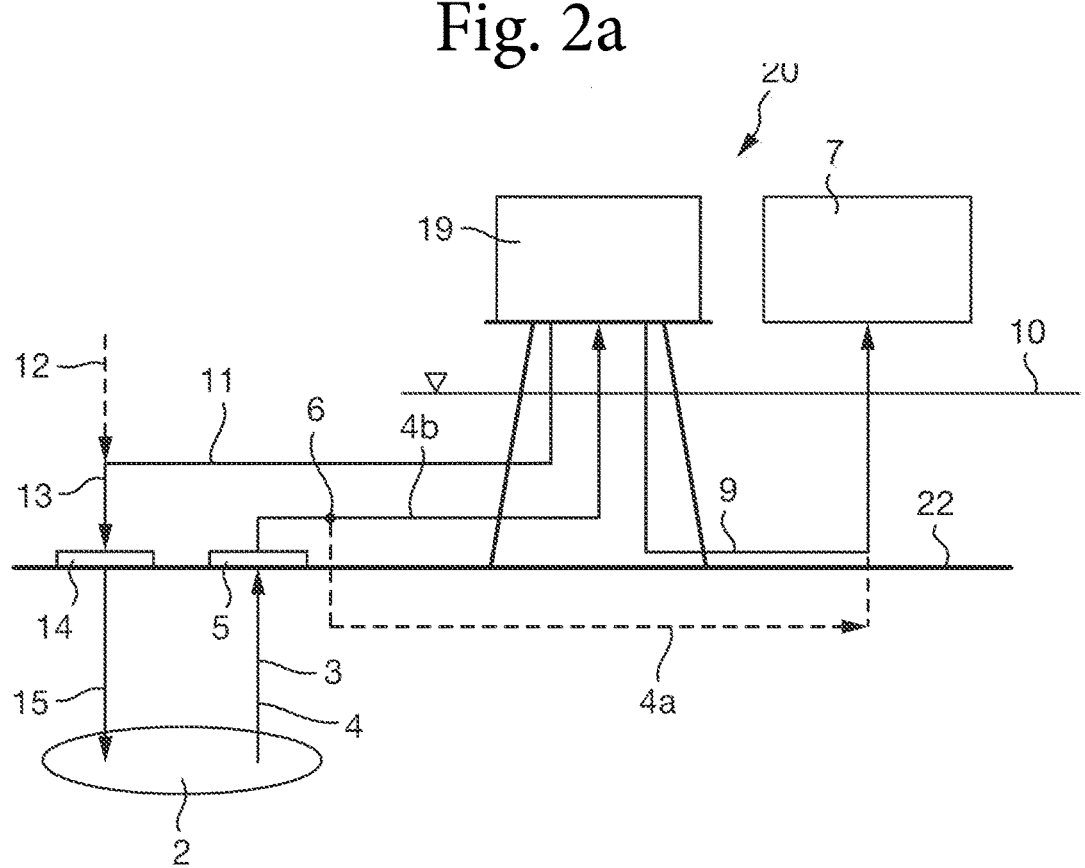
FIGS. 2a and 2b are generalised diagrams each illustrating an EOR system and method according to an embodiment of the invention wherein part of the process is carried out topside.

FIG. 2a illustrates an EOR system 20 of an embodiment in which part of the main process is carried out topside on a separate installation (platform or floater). Essentially, in this embodiment, the entire subsea process unit 8 of FIG. 1 is instead located above sea level 10, i.e. topside, and forms topside process unit 19. The other parts and processes of the system 20 are the same as those of FIG. 1, and so will not be described again here. As with FIG. 1a, whilst the mixing of the gas phase 11 with the imported $CO_2$ 12 into injection stream 13 is shown subsea, outside topside process unit 19, it may in fact be part of process unit 19. Thus, this part of the process may also be carried out topside.

Figure 2B:
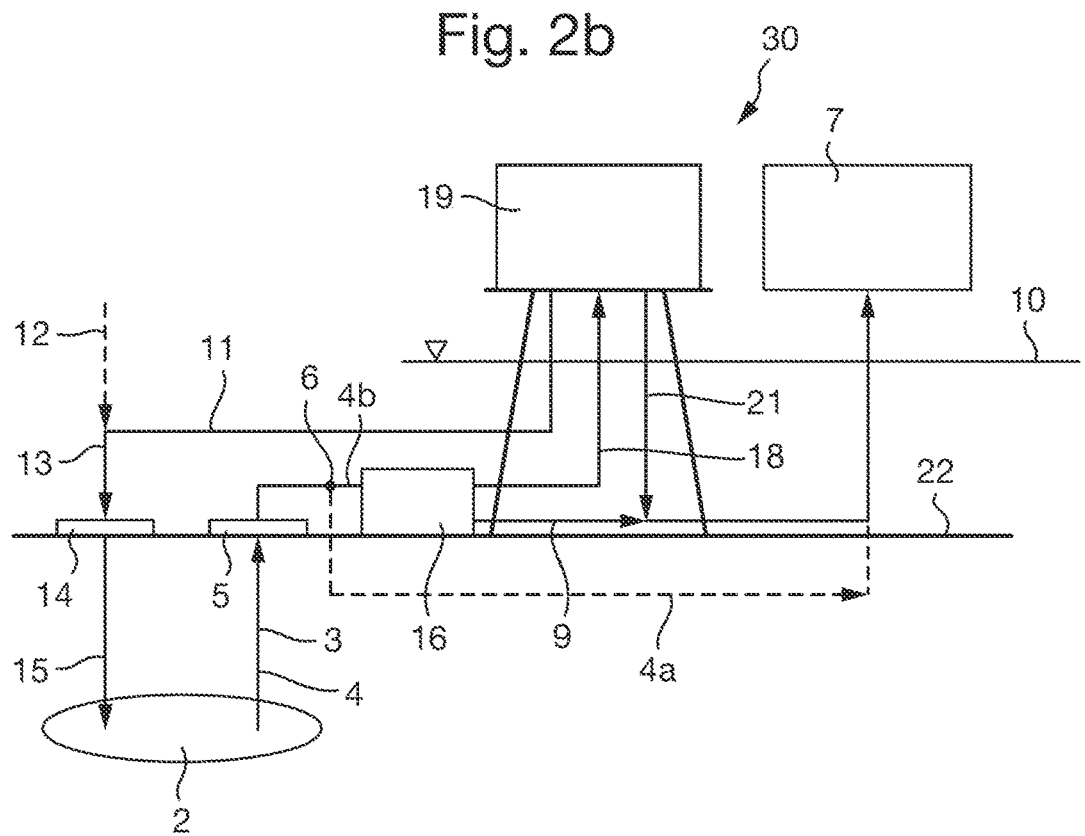

FIG. 2b is a modified version of the embodiment of FIG. 2a, wherein some processing steps are carried out subsea, and some carried out topside. As with FIGS. 1 and 2a, in this EOR system 30, a well stream 4 is produced from an oil reservoir 2 by the production piping 3 and passed out via well head 5. At point 6 it is determined whether $CO_2$ breakthrough has occurred yet. If it has not, then the well stream, numbered 4a, is directed to a top-side oil processing facility. In this case, since there is no back-produced $CO_2$, imported $CO_2$ 12 only from an external source forms stream 13 which is injected into the reservoir 2 via injection piping 15, to provide EOR.

If $CO_2$ breakthrough has occurred, i.e. $CO_2$ gas is now being back-produced, then the well stream, numbered 4b, is directed to gas/liquid separator 16, which separates the well stream 4b into a liquid phase 9 comprising oil and water and a gas phase 18 comprising $CO_2$ and hydrocarbon gas and dissolved water.

The liquid phase 9 is directed to the oil processing facility 17. The gas phase 18 is supplied to a topside process unit 19 above the surface, for example on a platform or a floater. This topside process unit 19 carries out various further process steps, resulting in a gas phase 11 comprising $CO_2$ and hydrocarbon gas which is mixed with imported $CO_2$ 12 from an external source, to form injection stream 13. Further process steps are carried out on this stream 13 (not shown) and it is then provided via injection well-head 14 to injection piping/injector 15, which injects the stream 13 into the reservoir 2.

As with FIG. 1a, whilst the mixing of the gas phase 11 with the imported $CO_2$ 12 into injection stream 13 is shown subsea, outside topside process unit 19, it may in fact be part of process unit 19. Thus, this part of the process may also be carried out topside.

Optionally, in the embodiment of FIG. 2b, the topside process unit 19 may carry out a further gas/liquid separation step on the gas phase 18 that it receives. In this case, the separated liquid phase 21 exits the topside process unit 19, mixes with the liquid phase 9 from the gas/liquid separator 16, and is input to the oil processing facility 7.

Figure 3:
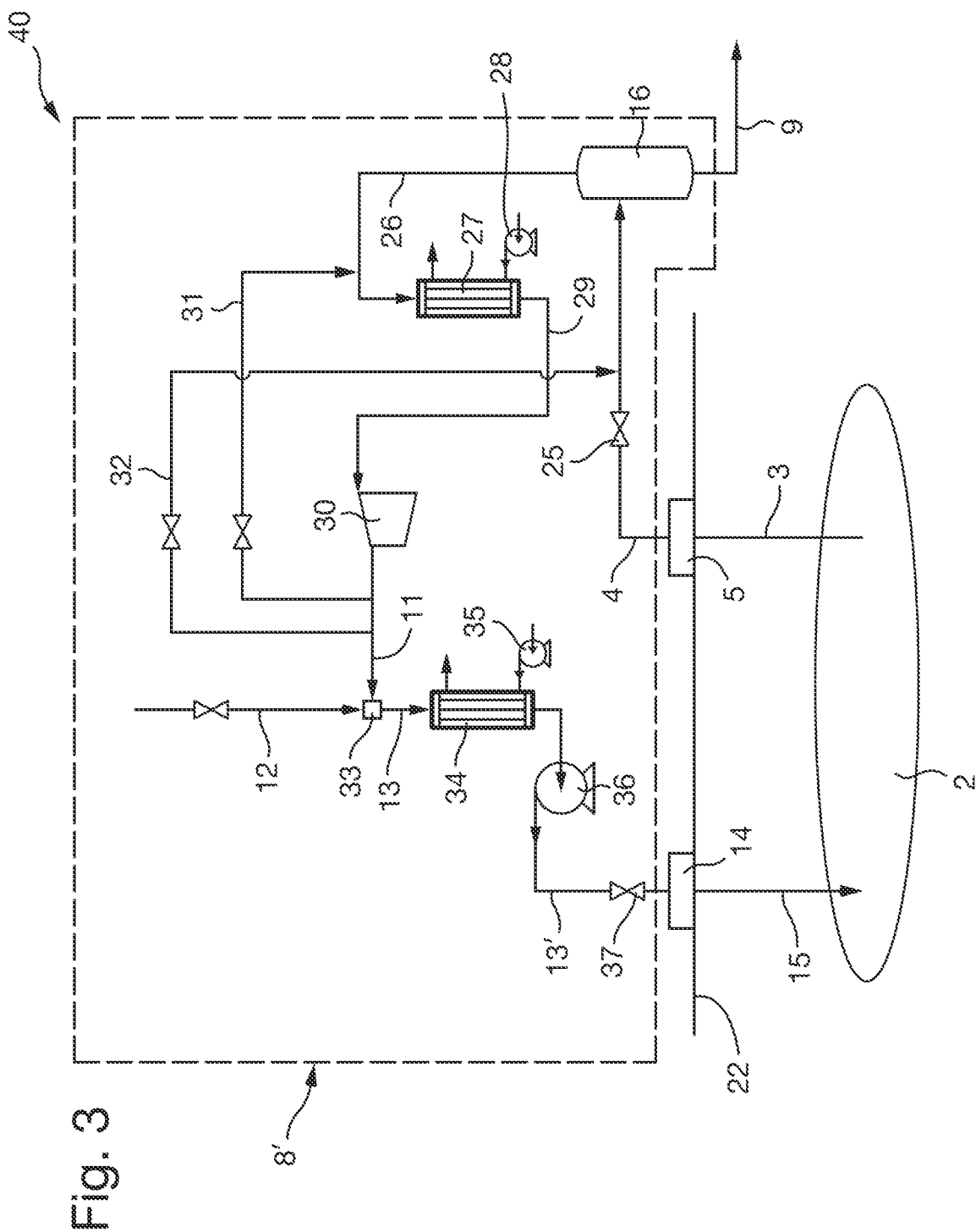
FIG. 3 is a process diagram illustrating an EOR system and method according to an embodiment of the invention in which corrosion-resistant piping is required.

FIG. 3 illustrates an EOR system 40 of an embodiment in which corrosion-resistant piping and equipment is required for the liquid phase downstream the separator 16. This embodiment is based on the general system configuration of FIG. 1b, wherein the entire process is carried out subsea. Parts common to both Figures are given the same reference numbers. The components within the dotted line box numbered 8' in FIG. 3 form the subsea process unit 8' of FIG. 1b. The entire system may be known as an "EOR process facility".

In the system of FIG. 3, a well stream 4 is produced from an oil reservoir 2 by production piping 3. It will be determined from an analysis of the well stream 4 whether $CO_2$ breakthrough has occurred yet, as described in relation to FIG. 1, though this is not illustrated in FIG. 3 for simplicity. If it has not, then the well stream, is directed to a top-side oil processing facility (again, not shown in this Figure), which may be considered as a first phase of operation. In this case, since there is no back-produced $CO_2$, imported $CO_2$ 12 from an external source forms stream 13' which is injected into the reservoir 2 via injector 15, to provide EOR. This may be considered as a second phase of operation.

If, as is likely, the pressure of the external $CO_2$ source is not sufficient for direct injection into the reservoir, a booster pump 36 is provided to increase the pressure prior to injection. The booster pump 36 delivers sufficient pressure to inject the $CO_2$ into the reservoir. The pressure required will depend on the pressure in the reservoir at the injection point, the necessary excess pressure to drive the $CO_2$ into the reservoir, the static pressure increase from the injection template to the injection point, and the frictional pressure drop in the injection pipe.

FIG. 3 also illustrates a subsea cooler 34 through which the stream 13 passes; however it is not necessary to cool the stream 13 if it comprises only external $CO_2$ 12, so in this situation the cooler 34 will be inactive. Since the cooler 34 is not required for external $CO_2$ 12 only, in an alternative configuration the external $CO_2$ 12 could be supplied downstream the cooler 34.

Once $CO_2$ breakthrough has occurred, i.e. $CO_2$ gas is now being back-produced, then the well stream 4 is directed to various process equipment which together form a "subsea process unit" 8. The point at which the well stream 4 should be directed to the subsea process unit 8 may be determined based on the composition of the well stream. For example, a certain gas composition, particularly a certain $CO_2$/methane ratio may be expected once $CO_2$ breakthrough has occurred. In this initial phase after $CO_2$ breakthrough, the methane content in the gas will be high and the $CO_2$ content low. Also, the total gas flow will be low, compared with later life.

First, the well stream 4 is choked by choke 25 to a pre-defined pressure, and is then directed to gas/liquid separator 16. The selection of the pressure level provided by the choke 25 will decide the partial pressure/content of $CO_2$ in the gas-phase and the $CO_2$ content in the liquid phase produced by the gas/liquid separator 16. A lower pressure will reduce the $CO_2$ content in the liquid. The separation pressure will also influence the compressor requirements (compressor 30, discussed later) and the power required for the gas to be injected, and will decide if the liquid phase 9 sent to the oil processing facility needs to be pressure boosted or not. If pressure boosting is required, a pump will be provided for liquid phase 9 (not shown in FIG. 3).

Moreover, the separation pressure will determine whether carbon steel can be used in the piping downstream the separator 16 (i.e. the piping connecting with the oil processing facility) or whether corrosion resistant materials are required. The higher the pressure, the more $CO_2$ there will be in the liquid phase 9. Due to the corrosive effect of $CO_2$, if the $CO_2$ in the liquid phase 9 is too high, some pipeline materials such as carbon steel will suffer from corrosion to an unacceptable extent. Thus, at higher pressures, the larger amounts of $CO_2$ in the liquid phase 9 requires the downstream piping to be manufactured from corrosion resistant material, such as stainless steel. In the embodiment of FIG. 3, the $CO_2$ content in the liquid phase 9 is high enough that the downstream piping must be made of corrosion resistant materials. Whilst this may be disadvantageous, the higher pressure means that no additional pumping is required for the liquid phase 9 (though in other embodiments a pressure boost may be required as discussed above).

However, in another embodiment, the separation pressure could be lowered to a level where corrosion resistant materials are not necessary, and thus the downstream piping could be made of carbon steel. A pump would then be required to increase the pressure of the liquid phase 9 after leaving the separator. Such embodiments are described later with reference to FIGS. 4 and 5.

Corrosion-resistant materials will always be required in the EOR process facility (i.e. the whole system of FIGS. 3, 4 and 5 except for the piping for liquid phase 9 in FIGS. 4 and 5) due to the separated gas phase comprising dissolved water, unless the gas phase is dehydrated.

Continuing the discussion of FIG. 3, the gas phase 26 separated by the separator 16 comprises both $CO_2$ and hydrocarbon gas and dissolved water. This is, if necessary, cooled in a subsea cooler 27. Preferably, this is an active cooler, here shown with pump circulation by a sea-water pump 18, so that the temperature can be adequately controlled to avoid hydrate formation and optimise the gas temperature prior to later mixing with external $CO_2$. The cooled gas 29 is input to compressor 30 which increases the pressure thereof, forming cooled, compressed gas 11. Preferably, the compressor 30 is a liquid tolerant compressor since liquid may form after the cooler 27. If the compressor is not liquid tolerant, an additional gas/liquid separator may be required upstream the compressor to separate any liquid that has formed during cooling (not shown in the Figure). An additional liquid pump may also then be needed to bring the liquid phase back to the main gas/liquid separator 16 or directly to the liquid phase 9 being directed to the oil processing facility.

In FIG. 3, one-stage compression is shown utilising a single compressor 30. However compression in more than one stage (i.e. by more than one compressor in series) is also possible and may be used if the required pressure is higher than can be achieved by one compressor. However, for simplicity, a design such as that illustrated requiring only one compressor 30 is preferable (this is also less expensive).

The well stream gas flow rate after $CO_2$ breakthrough will be highly dynamic (mainly increasing) especially in the first period of operation, before a more stable situation is reached. To give an example, if the operational time for the $CO_2$ EOR facility is 10 years after $CO_2$ breakthrough, the largest dynamics would happen in the first 1 to 2 years. To handle this dynamic situation, a compressor recycle is provided. As can be seen, a recycle flow 32 from downstream the compressor 30 is directed into the well stream 4 upstream the gas liquid separator 16. This provides more stable conditions for the separator operation, as it allows the separator to operate within narrower gas and liquid load ranges during the lifetime of the oil reservoir 2, which simplifies the operation and control of the separator. Alternatively, the compressor recycle flow 32 can be mixed into the gas 26 downstream the gas/liquid separator 16.

To protect the compressor against surge, an anti-surge line 31 is also provided. Gas from downstream the compressor 30 is directed into the separated gas 26 upstream from the cooler 27. Alternatively, gas from downstream the compressor 30 may be mixed with the well stream 4 upstream the gas/liquid separator 16. It will be appreciated that in one embodiment, a combined compressor recycle and anti-surge line may be provided.

Downstream the compressor 30, the gas phase 11 is mixed at mixer 33 with $CO_2$ 12 from an external supply. The pressure of the external $CO_2$ and the compressed gas phase 11 needs to be balanced. In a first phase after $CO_2$ breakthrough, the gas flow 11 from the compressor will be low and contain high concentrations of methane. This gas needs to be condensed prior to injection into the reservoir 2. However, a very high pressure from the compressor would be required for condensation by sea-water alone, and there would be a high risk of hydrate formation. However, by mixing the gas 11 with the external $CO_2$ 12, the gas 11 will condense/dissolve in the external $CO_2$ during the mixing process or in subsequent cooling by cooler 34. Thus, the compression requirement is lower.

The process temperatures are controlled by both sea-water coolers 34, 27 to avoid hydrate formation. It is desirable to reach a lower temperature after the mixing and cooling, to increase the density of the fluid, preferably liquid, leaving the cooler 34, but at the same time stay above the hydrate formation temperature. Therefore, the cooler 34 is preferably an active cooler, with sea water circulation by a sea water pump 35. In an alternative embodiment, the gas 11 is cooled prior to (rather than after) being mixed with the external $CO_2$ 12.

The pressure of the fluid leaving the cooler 34 is increased by booster pump 36, then the resulting fluid 13' comprising a high proportion of $CO_2$ is injected into the reservoir 2 via injection well head 14 and injection piping 15, yielding enhanced oil recovery. Typically, the proportion of $CO_2$ in the injection fluid 13' will be between 85-95 mole % of the total fluid (though this will be case specific). The $CO_2$ is ultimately back-produced via production tubing 3 and recycled through the process again.

After some time, the gas flow rate from the reservoir 2 will stabilise and contain more and more $CO_2$, up to 80-90 mole % or more. When the gas flow rate increases, the required amount of external $CO_2$ 12 reduces.

Whilst in the embodiment of FIG. 3 the entire process is carried out subsea (as in the general configuration of FIG. 1b), the mixing of external $CO_2$ and the processes downstream of this could be carried out subsea whilst the remainder of the method is carried out topside on a platform or floater, e.g. as in FIG. 2a. Or, the external $CO_2$ could also be taken topside for mixing, cooling and pumping. Or, the gas/liquid separation could be carried out subsea, the mixing with external $CO_2$ and the downstream processes carried out subsea, and the remainder of the method carried out topside (as in FIG. 2b).

Example process data for an implementation of the embodiment of FIG. 3 will now be given:
Temperature of well stream 4 prior to being choked: 90° C.
Pressure of well stream 4 prior to being choked: 60 bara (600 kPa)
Pressure of well stream after being choked: 30 bara (300 kPa)
Temperature of gas phase 29 exiting the first cooler 27: 20-40° C.
Pressure of gas phase 11 exiting the compressor 30: 85 bara (8500 kPa)
Temperature of external $CO_2$ 12: 9° C.
Pressure of external $CO_2$ 12: 85 bara (8500 kPa)
Temperature of injection stream 13' exiting cooler 34: 15-30° C.
Temperature of injection stream 13' entering injection piping 15: 15-35° C.
Pressure of injection stream 13' entering injection piping 15: 120-160 bara (12000-16000 kPa)
Pressure in reservoir 2 at injection point: 320-360 bara (32000-36000 kPa)
Depth of oil reservoir 2: 2600 m It will be appreciated that these values are approximate, and are for one particular example only.

Figure 4:
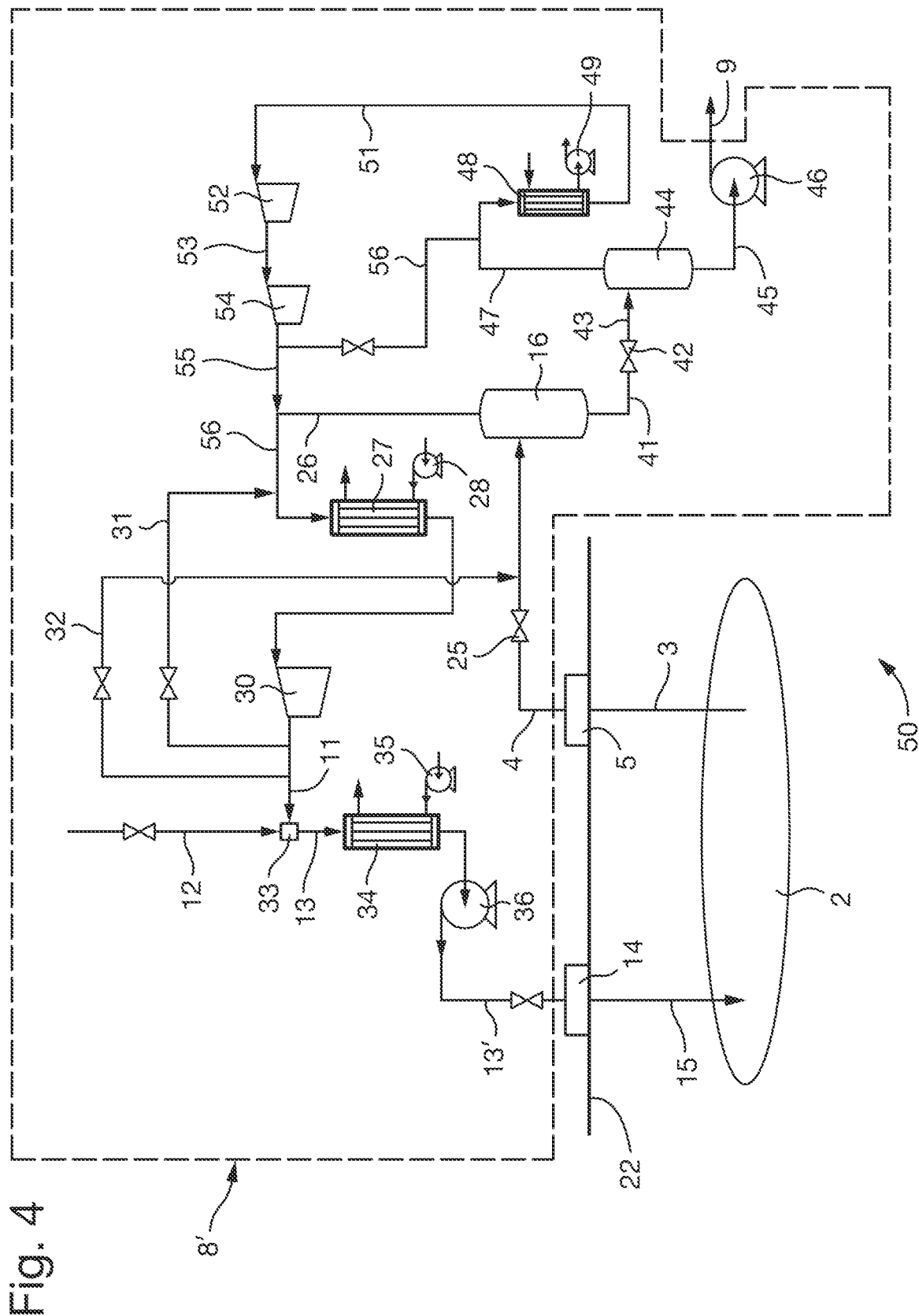
FIG. 4 is a process diagram illustrating an EOR system and method according to an embodiment of the invention in which a secondary separation process is carried out.

FIG. 4 illustrates an embodiment of an EOR system 50 in which a secondary separation process is carried out. Much of this system 50 is the same as that of FIG. 3, and will not be described again here. Parts common to both Figures are given the same reference numbers. The difference between the embodiments of FIGS. 3 and 4 is that in FIG. 4, there is a secondary gas/liquid separation process. In other words, the gas/liquid separation is carried out in multiple stages, in this embodiment two stages, but in other embodiments the system may be extended to more than two stages.

Gas/liquid separator 16, as in FIG. 3, separates the well stream 4 into gas phase 26 comprising both $CO_2$ and hydrocarbon gas, and a liquid phase. However, the liquid phase is not then directed directly to an oil processing facility as stream 9. Instead, the liquid phase 41 from the gas/liquid separator 16 is choked down to a lower pressure by choke 42 which results in the formation of more gas, The reduced pressure gas/liquid flow 43 is input to a further gas/liquid separator 44, which separates the gas phase 47. The partial pressure of $CO_2$ in the gas phase results in $CO_2$ content in the liquid phase 45 being low enough to allow for a carbon steel pipeline to the oil processing facility and in the oil processing facility itself. In other words, since there is less $CO_2$ in the liquid 45, the liquid is less corrosive, so corrosion-resistant piping is not required and carbon steel can instead be used. Due to the reduced pressure of the liquid 45, an export pump 46 is provided to pump the liquid, as liquid 9, to the oil processing facility.

The liquid phase 45 will still be corrosive to some extent though, as some $CO_2$ will still be dissolved in it, so a corrosion control method such as the injection of a film forming corrosion inhibitor may be used to limit the corrosion rate of the pipeline and process equipment.

The gas stream 47 is, if required, cooled by cooler 48, here shown as an active cooler with sea-water circulation by sea water pump 49. However in other embodiments a passive cooler may be used. The pressure is likely to be low enough that hydrates are not an issue, so active cooling may be less essential.

The flow rate of the gas stream 47 from the gas/liquid separator 44 is substantially lower than that of the gas stream 26 from the gas/liquid separator 16. To bring the latter up to the same or similar flow rate/pressure as the former, more than one compressor is required if the required pressure ratio for the compression is too high for one compressor. Thus, the cooled gas stream 51 from the cooler 48 is compressed by compressor 52 to form compressed stream 53, followed by compressor 54 to form further compressed stream 55. If the total pressure ratio is low enough, intermediate cooling between the compressors is not needed, but may be required for higher pressure ratios. The compressors are preferably both liquid tolerant compressors, or at least the compressor 52 should be a liquid tolerant compressor. Optionally, dry gas compressors may be used, and if so then upstream separators/scrubbers will be needed.

The compressors 52 and 53 are smaller than compressor 30, and the power requirement is typically less than 10% of that of the compressor 30. The operational conditions of compressors 52 and 53 will likely be constant enough to avoid the need for compressor recycle, but if not a compressor recycle system similar to shown in FIG. 3 could be introduced To protect the compressors 52 and 53 against surge, and anti-surge line 56 is provided. Gas from downstream compressor 53 is directed into the separated gas 47 upstream from the cooler 48. Alternatively, gas from downstream the compressor 53 may be mixed with the liquid phase 43 upstream the gas/liquid separator 44.

In other embodiments, more than two compressors may be necessary.

The compressed gas 55 is mixed into separated gas stream 26, to form combined gas stream 56. This is then processed in the same way as in gas stream 26 in FIG. 3, and ultimately injected into the reservoir 2.

Figure 5:
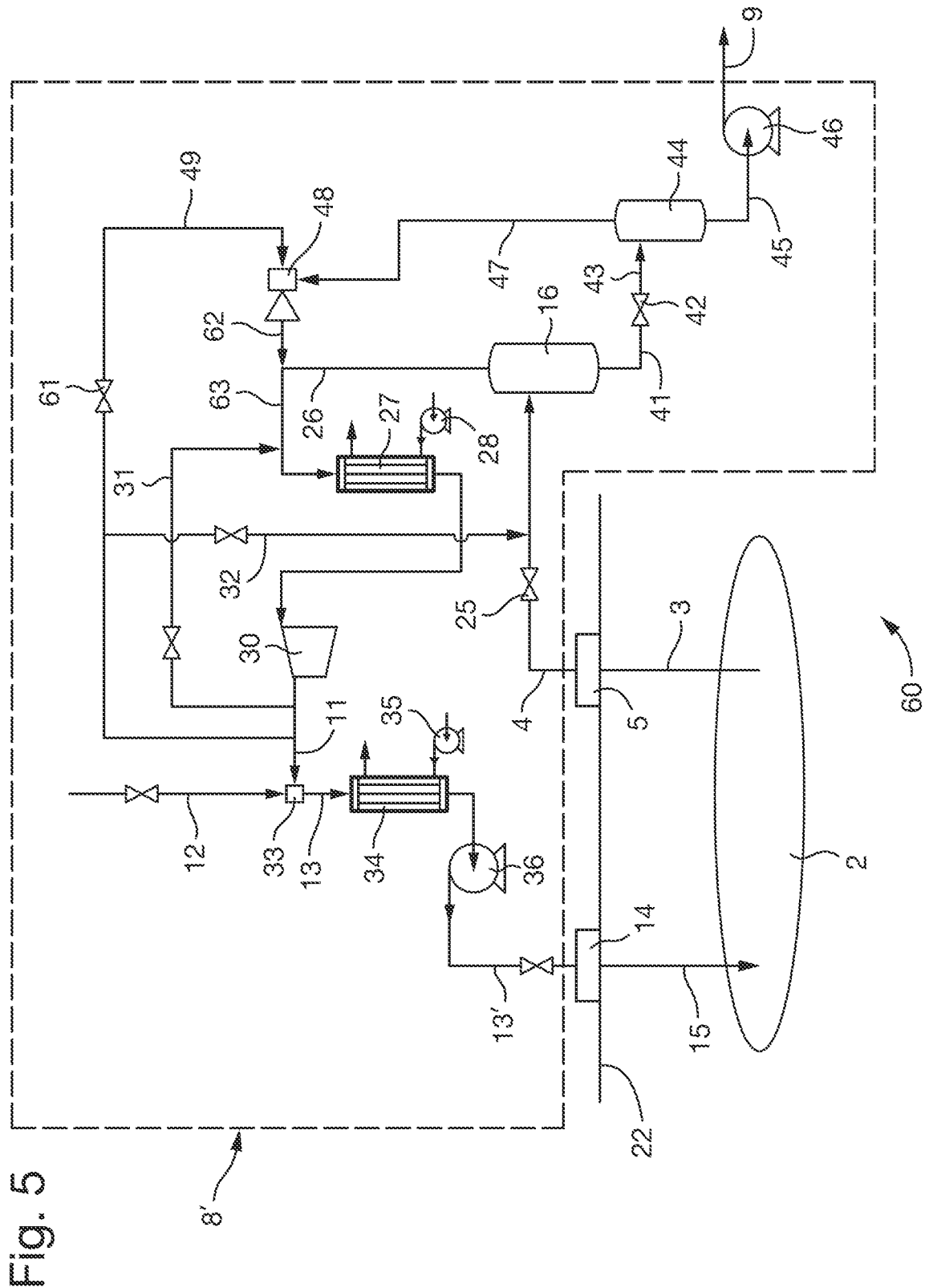
FIG. 5 is a process diagram of an alternative embodiment of an EOR system and method in which a secondary separation process is carried out.

FIG. 5 illustrates an alternative embodiment of an EOR system in which a secondary separating process is carried out. Much of this system is the same as that of FIG. 4, and will not be described again here. Parts common to both Figures are given the same reference numbers. The difference between the embodiments of FIGS. 4 and 5 is that in FIG. 5, the compressors 52 and 53 are replaced with an ejector 48.

In this embodiment, the gas stream 47 is directed to ejector 48. Ejector 48 is powered by motive gas flow 49 from downstream the compressor 30. The ejector utilises this high pressure gas flow 49 to increase the pressure of stream 47. This significantly simplifies the system, and may also remove the need for any intermediate cooler. Since the ejector motive gas flow 49 is taken from downstream the compressor 30, this will be ultimately be recycled through the compressor 30, in addition to the compressor recycle flow 32. Thus, more gas might be recycled through the compressor 30 in the embodiment of FIG. 5 than in the embodiment of FIG. 4. This could potentially increase the compressor power requirement.

In some embodiments, more than one ejector may be used.

Whilst in the embodiments of FIGS. 4 and 5 the entire process is carried out subsea (as in the general configuration of FIG. 1), the subsea process unit 8 could instead be located topside on a platform or a floater (as in FIG. 2a) or onshore, instead of subsea. Or, either or both of the gas/liquid separations could be carried out subsea but the other process steps carried out topside (as in FIG. 2b). Moreover, whilst in the embodiments shown the reservoir 2 is an offshore reservoir, the process is equally applicable to onshore reservoirs.

The invention claimed is:

1. A method of Enhanced Oil Recovery (EOR) from an oil reservoir by $CO_2$ flooding, comprising:
    producing a well stream from an oil reservoir;
    separating the well stream into a liquid phase and a gas phase with a first gas/liquid separator, wherein the gas phase comprises both $CO_2$ gas and hydrocarbon gas;
    cooling the gas phase with a first cooler;
    compressing the gas phase using a first compressor into a compressed stream;
    mixing the compressed stream with an external source of $CO_2$ in a mixer to form an injection stream;
    cooling the injection stream with a second cooler arranged downstream of the mixer; and
    injecting the injection stream into the reservoir.

2. The method as claimed in claim 1, wherein the gas phase is cooled prior to compression.

3. The method as claimed in claim 1, wherein the first cooler is an active cooler.

4. The method as claimed in claim 1, wherein the gas phase separated by the first gas/liquid separator comprises water vapour in addition to $CO_2$ and hydrocarbon gas.

5. The method as claimed in claim 1, wherein the well stream is choked to a pre-defined pressure prior to separating the well stream into a liquid phase and a gas phase.

6. The method as claimed in claim 1, wherein prior to separating the well stream into a liquid phase and a gas phase, the well stream is heated.

7. The method as claimed in claim 1, wherein the oil reservoir is an offshore reservoir.

8. The method as claimed in claim 7, wherein the method is carried out subsea;
    or wherein at least the steps of separating the well stream, cooling the gas phase with the first cooler and compressing the gas phase are carried out above sea level;
    or wherein the step of separating the well stream is carried out subsea, and the steps of cooling the gas phase with the first cooler and compressing the gas phase are carried out above the sea.

9. The method as claimed in claim 1, wherein after compressing the gas phase, part of the compressed gas phase is recycled into the well stream upstream the gas/liquid separator or into the gas phase downstream the gas/liquid separator.

10. The method as claimed in claim 1, wherein after compressing the gas phase, part of the compressed gas phase forms an anti-surge flow which is directed into the gas phase downstream the gas/liquid separator and upstream the cooler.

11. The method as claimed in claim 1, wherein the cooled injection stream is pumped by a booster or injection pump.

12. The method as claimed in claim 1, wherein the gas phase is compressed in two stages using two compressors.

13. The method as claimed in claim 1, wherein the injection stream comprises 85 to 95 mole % $CO_2$.

14. The method as claimed in claim 1, wherein the liquid phase is transported to an oil processing facility.

15. An enhanced oil recovery system, comprising:
a producer arranged to produce a well stream from a reservoir;
a first gas/liquid separator arranged to separate the well stream into a liquid phase and a gas phase comprising both $CO_2$ gas and hydrocarbon gas;
a first cooler arranged to cool the gas phase;
a first compressor arranged to compress the gas phase into a compressed stream;
a mixer arranged to mix the compressed stream with an external source of $CO_2$ to form an injection stream;
a second cooler downstream of the mixer to cool the injection stream; and
injection piping arranged to inject the injection stream into the reservoir.

16. The system as claimed in claim 15, wherein the first cooler is arranged upstream of the first compressor to cool the gas phase prior to compression.

17. The system as claimed in claim 15, wherein the first cooler is an active cooler.

18. The system as claimed in claim 15, further comprising a choke arranged upstream the first gas/liquid separator to choke the well stream to a pre-defined pressure.

19. The system as claimed in claim 15, further comprising a heat exchanger arranged upstream the first gas/liquid separator to heat the well stream.

20. The system as claimed in claim 15, wherein the system is located subsea;
or wherein the first gas/liquid separator, first cooler and first compressor is located above sea level;
or wherein the first gas/liquid separator is located subsea whilst the first cooler and first compressor are located above the sea.

21. The system as claimed in claim 15, further comprising a recycle line connecting between downstream the first compressor and either upstream the gas/liquid separator or downstream the gas/liquid separator, the recycle line being arranged to recycle part of the compressed gas phase into either the well stream upstream the gas/liquid separator, or the gas phase downstream the gas/liquid separator.

22. The system as claimed in claim 15, further comprising an anti-surge line connecting between downstream the first compressor and a point downstream the gas/liquid separator and upstream the first cooler, the anti-surge line being arranged to provide an anti-surge flow of compressed gas phase into the gas phase downstream the gas/liquid separator and upstream the first cooler.

23. The system as claimed in claim 15, further comprising a booster pump or injection pump arranged downstream the second cooler to pump the injection stream.

24. The system as claimed in claim 15, further comprising corrosion-resistant piping arranged to transport the liquid phase to an oil processing facility.

25. A method used in Enhanced Oil Recovery (EOR) from an oil reservoir by $CO_2$ flooding, comprising:
producing a well stream from the reservoir;
separating the well stream into a liquid phase and a gas phase with a gas/liquid separator;
compressing the gas phase using a compressor;
injecting a first part of the compressed gas phase into the reservoir; and
recycling a second part of the compressed gas phase into the well stream upstream the gas/liquid separator so as to provide stable conditions for operation of the separator in the presence of a dynamic well stream gas flow rate.

* * * * *